United States Patent [19]

Baker

[11] 4,232,351
[45] Nov. 4, 1980

[54] HIGH-VOLTAGE CROWBAR CIRCUIT WITH CASCADE-TRIGGERED SERIES IGNITRONS

[75] Inventor: William R. Baker, Orinda, Calif.

[73] Assignee: The United States of America as represented by the United States Department of Energy, Washington, D.C.

[21] Appl. No.: 740

[22] Filed: Jan. 3, 1979

[51] Int. Cl.³ .................................................. H02H 9/04
[52] U.S. Cl. ........................................ 361/56; 315/36
[58] Field of Search ............... 361/16, 17, 54, 55, 361/56, 57, 130; 315/36, 37, 124, 189, 241, 330

[56] References Cited

U.S. PATENT DOCUMENTS

| | | |
|---|---|---|
| 2,575,232 | 11/1951 | Parker . |
| 2,928,956 | 3/1960 | Jones . |
| 3,087,091 | 4/1963 | McFarland ..................... 315/189 X |
| 3,267,331 | 8/1966 | Melhart . |
| 3,339,111 | 8/1967 | Possner . |
| 3,418,530 | 12/1968 | Cheever ............................... 361/56 |
| 3,723,820 | 3/1973 | Brown . |
| 3,943,427 | 3/1976 | Tolsov et al. . |
| 4,023,071 | 5/1977 | Fussell ................................. 361/56 |
| 4,040,000 | 8/1977 | Dwivedi ........................ 315/241 R X |
| 4,054,933 | 10/1977 | Praeg ................................. 361/57 |

Primary Examiner—Harry E. Moose, Jr.
Attorney, Agent, or Firm—James E. Denny; Roger S. Gaither; Clifton E. Clouse, Jr.

[57] ABSTRACT

A series string of ignitrons for switching a large current at high voltage to ground. Switching is initiated by means of a negative trigger pulse applied to the cathode of the lowest voltage level ignitron next to ground to draw ground current through diodes in the ignitor circuit. The trigger pulse is applied thereby to the next higher ignitron cathode and sequentially to the remainder of the ignitrons in the string through diodes in respective ignitor circuits. Full line voltage is held off of nonconducting diodes and ignitrons by means of varistors.

16 Claims, 1 Drawing Figure

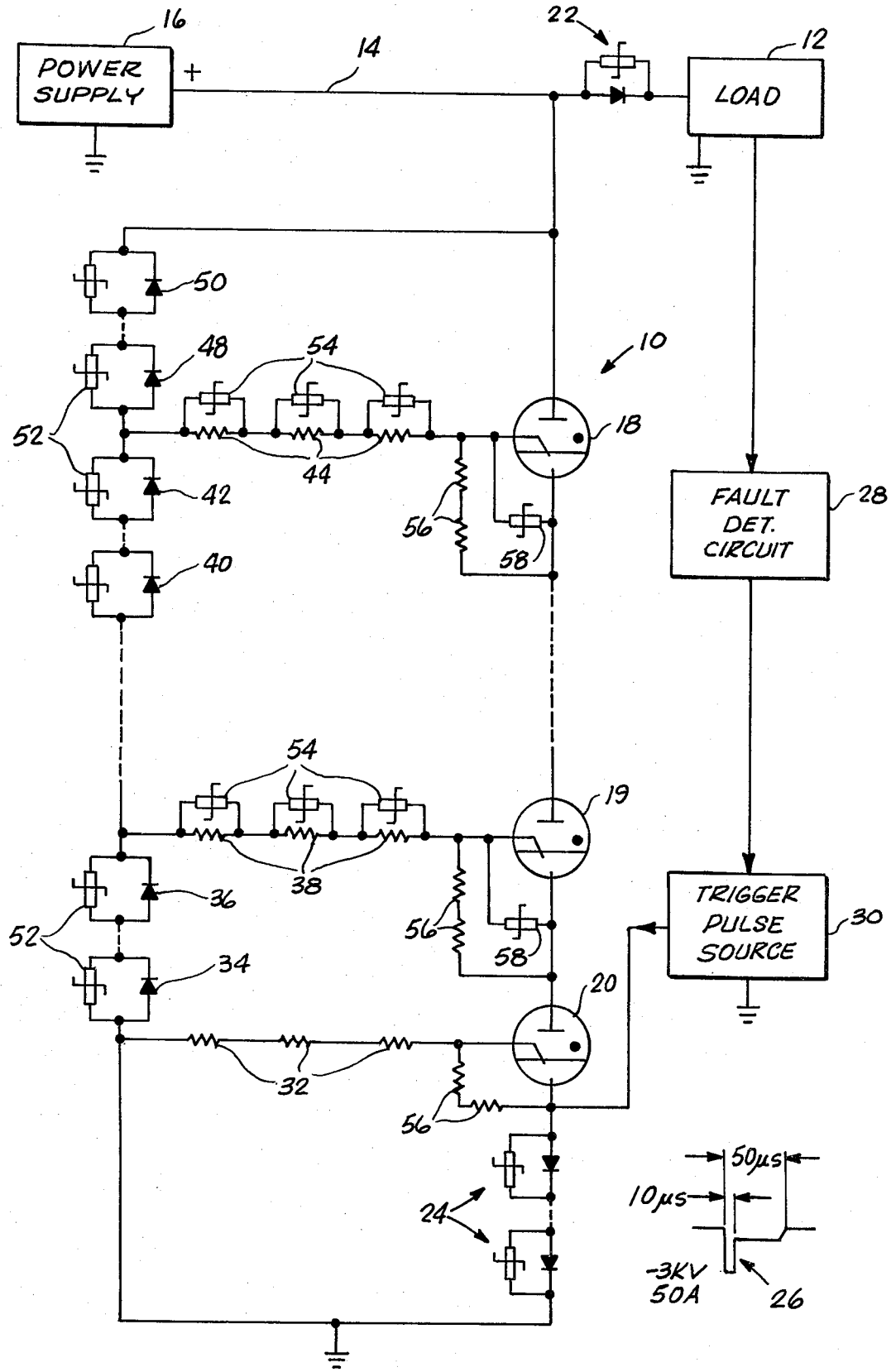

HIGH-VOLTAGE CROWBAR CIRCUIT WITH CASCADE-TRIGGERED SERIES IGNITRONS

BACKGROUND OF THE INVENTION

The invention disclosed herein was made under, or in, the course of United States Department of Energy Contract No. W-7405-ENG-48 with the University of California.

The invention relates to high-voltage crowbar circuits, and more particularly, it relates to a passive trigger circuit for sequential or cascade triggering of a series string of ignitrons.

It is customary to use a crowbar to protect sensitive high-voltage high-power equipment from damage due to fault currents. The crowbar is used to ground out the power supply for the equipment and thereby divert the fault currents until the primary ac power to the equipment can be interrupted. Fault current damage usually is not significant if the crowbar action occurs in $10^{-5}$ sec or less. For switching currents at low voltages, the crowbar may be a single ignitron or a spark gap, and the circuitry is uncomplicated. However, for switching currents at high voltages around 30 kV or greater, ignitrons are used in series for reliable operation but traditionally require complex electronic triggering circuits and transformers for each ignitron, while spark gaps must have wide gaps for high voltages and therefore require complex keep-alive circuits. Moreover, the crowbar must also be able to function when the operating voltage is near zero, as in the case of a load fault where a spark breakdown has already shorted the high load voltage before the crowbar can be actuated. For near zero operation in the case of a spark gap, the gap tends to quench at low voltages, especially when it is provided with a wide gap for high voltage operation. For near zero operation of ignitron crowbars with usual ignitor-cathode trigger circuits, there is the requirement of a series impedance between the load and a transiently "stiff" power supply (i.e. a condenser) to supply anode-cathode voltage for a few microseconds after a fault occurs to enable the ignitrons to pickup the load. Such ignitron circuits therefore not only require complex triggering circuits but complex expensive power supplies for near zero operation.

SUMMARY OF THE INVENTION

In brief, the invention relates to a crowbar circuit for shunting current from either a high-voltage load level to a near zero voltage load level, including a first triggerable high voltage current conducting device for connection to the high voltage level, a second triggerable high voltage current conducting device for connection between the low-voltage level and the first ignitron, a trigger pulse source for generating a trigger pulse, and passive means responsive to the trigger pulse from the source for triggering the second device to conduct the responsive means being operable upon conduction of the second device to apply substantially the full trigger pulse to the first device for triggering the first device to conduct.

It is an object of the invention to provide an improved crowbar circuit.

Another object is to rapidly, simply and reliably switch large currents ranging from high voltages to zero voltage.

Another object is to provide a simple, low cost, reliable direct coupled passive circuit for triggering a series arrangement of ignitrons.

Another object is to switch a load current from a high-voltage bus that may be fed from a variety of types of power supplies including one fed from a "soft" power supply (no series impedance at output and usually fed by a condenser) to ground.

Other objects and advantageous features of the invention will be apparent in a description of a specific embodiment thereof, given by way of example only, to enable one skilled in the art to readily practice the invention which is described hereinafter with reference to the accompanying drawing.

BRIEF DESCRIPTION OF THE DRAWING

The FIGURE is a schematic diagram of a high-voltage crowbar circuit provided with a passive circuit for sequentially triggering a series string of ignitrons, according to the invention.

DETAILED DESCRIPTION OF THE INVENTION

Reference will now be made in detail to the present preferred embodiment of the invention, an example of which is illustrated in the accompanying drawing.

While the invention will be described in connection with a preferred embodiment, it will be understood that it is not intended to limit the invention to that embodiment. On the contrary, it is intended to cover all alternatives, modifications and equivalents as may be included within the spirit and scope of the invention defined in the appended claims.

Referring to the drawing, there is shown in the FIGURE a schematic diagram of a high-voltage crowbar circuit 10 for protecting a load 12 in the event of a load fault by diverting fault current from a high-voltage bus 14 over which power from a high-voltage power supply 14 normally is supplied to the load. The fault current is diverted by means of ignitrons 18, 19 and 20 which are connected in a series string, with the anode of tube 18 connected to the bus 14 through a diode-varistor network 22 (to isolate triggering voltage from the load 12), and the cathode of tube 20 connected to ground through varistor-diode networks 24. For very high voltage operation additional ignitron and associated circuitry usually are connected in series with the tubes 18–20; but for simplification of illustration this is indicated by dotted lines only.

In order to start fault current diversion, each of the ignitrons is ignited, starting with the tube 20, by means of a negative trigger pulse 26. Such a pulse, in the example being described, may be initiated by a fault detection circuit 28 whenever a fault occurs in the load 12. The circuit 28 is used to drive a trigger pulse source 30 to develop the negative pulse 26 which is applied to the tube 20 cathode. This condition causes current flow from ground through a string of resistors 32 to the ignitor element and cathode of tube 20, thereby igniting the tube 20 to conduct current from ground through diodes 34 and 36, resistors 38 and varistors 54 thereacross in parallel, and the ignitor-cathode contact of tube 19. The full trigger pulse 26 is thus applied across the ignitor element and cathode of tube 19, thereby causing the tube 19 to begin conduction. The remainder of the ignitor tubes in the series are similarly triggered until tube 18 is ignited by ground current through diodes 34, 36, 40 and 42 and resistors 44. Upon conduction of the tube 18, the voltage on bus 14 plus trigger pulse 26 voltage is applied across the ignitrons 18-20 and full power supply load current is rapidly diverted thereby to ground until primary ac current to power supply 16 or its dc output current can be disrupted. The load 12 is thus protected from any faults developing therein.

Under normal non-fault operating conditions, the inverse voltage across each of the diodes 34, 36, 40 and 42, is clamped to a level below the inverse voltage rating of the diodes by varistors 52 to prevent destructive breakdown of the diodes because of unequal voltage distribution on the diodes due to differences in capacitance and resistance.

The varistors 52 are also used to protect the tubes 19-20 from transient overvoltage during switching. After the tube 20 is ignited and as each succeeding ignitron tube is fired, the remaining unfired tubes in the string would have the full voltage on the bus 14 applied thereacross. Such a voltage may easily transiently exceed the voltage ratings of the tubes 18-20 and cause tube arcing. This transient overvoltage is reduced to acceptable levels in the circuit 10 by means of the varistors 52 by channeling power supply current to ground through the fired tubes and then through the varistors 52 associated with the unfired tubes. The varistors 52 actually used in the circuit 10 are rated to conduct a transient current of 2500 amps for less than 20 microseconds. This rating is well within the levels and periods for which the circuit 10 is designed to operate.

Resistors 32, 38 and 44 are provided to limit the starting current from ignitor to cathode to be within rated levels for respective ignitrons 20, 19 and 18. Varistors 54 are connected across resistors 38 and 44 to share the starting ignitor current with the resistors and thereby keep the starting surge voltage across the resistors within rated value of the resistors. When high voltage is present initially and the cascading process is underway, the varistors 54 also channel starting current from the power supply into the ignitors of the remaining ignitrons and thereby speeds the triggering of these tubes.

Resistors 56 are provided across the ignitor and cathode of each ignitor 18, 19 and 20 to maintain initial zero voltage thereacross so that each ignitron 18-20 will start at a predetermined voltage on the ignitor. This ensures there will be no spurious ignition of the ignitrons due to voltage buildup across respective ignitor-cathode contacts. Varistors 58 are also connected across the ignitor and cathode of each ignitor 18 and 19 to limit the voltage rise thereacross to a level below the rated level for the ignitor during ignition. The normal voltage on the ignitors of tubes 18 and 19 is above ground; hence the protection of varistors 58 is required for tubes 18 and 19, but not for tube 20 wherein the ignitor is held at ground level.

In an embodiment of the invention actually constructed and operated and using a string of six ignitrons in connection with a power supply, for testing of multi-megawatt neutral atomic beam sources to be used in the Princeton Plasma Physics Laboratory's Tokamak Fusion Test Reactor magnetic fusion experiment, the following components were used and results obtained:

| | |
|---|---|
| Ignitrons 18-20 plus three not shown for a string of six ignitrons | General Electric Tube Type GL 37248 |
| Varistors 52 in strings of 55 each between ignitor sections | General Electric Varistor Type V 275LA20B |
| Diodes 34, 36, 40, 42, 48 and 50, in strings of 55 each between ignitor sections, each varistor 52 being connected across one such diode. | International Rectifier Type 1R60S10 |
| Resistors 32, 38 and 44 | Each 20 ohms 2 watt |
| Varistors 54 | General Electric Varistor Type V 480 LB 40A |
| Resistors 56 | Each 510 ohms 2 watt |
| Varistors 58 | General Electric Varistor Type V 1000 LB80A |

The circuit 10 (for a string of five ignitrons) was operated to switch 75A at 120 KV from the bus 14 to ground in 2 microseconds even where the voltage was dropped to zero. Triggering of the circuit 10 was initiated with a negative 3 KV trigger pulse 26 to ignite the tube 20 and complete overall breakdown of the entire string of tubes 18-20 in 2 microseconds at approximately 0.4 microseconds delay per tube with 50A of trigger current. Operation at zero voltage on bus 14 is possible since the trigger pulse is negative and is applied across the anode and cathode at a level that is sufficient for triggering the tubes in the manner described hereinbefore.

It should be noted that the circuit 10 can also be connected for "normal" grounded cathode operation simply by moving the ground point to the cathode of tube 20, applying a positive 3 KV pulse to the former ground point with respect to the cathode and eliminating networks 24 and the diodes 48 and 50. However, in this mode a significantly longer trigger time is required when a load fault occurs and the voltage across the crowbar is low. By triggering the cathode of tube 20, tube conduction is faster because the trigger pulse 26 also appears as anode-cathode potential for it and, in sequence, for the remaining tubes.

It should be noted further that ignitrons in intermittent or low duty service (such as in the expected use of the circuit 10) occasionally lose voltage-holding ability after an extended period due to mercury vapor that accumulates on the anode insulator and progressively bridges the insulator with a layer of small conducting mercury droplets. To avoid this condition, a thermal gradient should be established so that the anode region is maintained a few degrees warmer than the cathode. Simple, effective heat pipes can be used to maintain the gradient. Alternatively, and in the embodiment of circuit 10 actually constructed, a central hot air supply is used, with six individual, flexible, insulating tubes feeding warm air to simple heat exchangers that are made as integral parts of the anode connectors. The hot air is simply vented at each anode heat exchanger.

While embodiments of the invention have been shown and described, further embodiments or combinations of those described herein will be apparent to those skilled in the art without departing from the spirit of the invention. For example, the invention could also be used in connection with other triggerable tubes such as thyratrons or triggerable solid state devices such as SCR's. In general the invention should find use with high voltage triggered current conducting devices of various kinds in addition to ignitrons.

What is claimed is:

1. A crowbar circuit for shunting current from a high voltage level to a low voltage level, comprising:
   a first triggerable high voltage current conducting device for connection to the high-voltage level;
   a second triggerable high voltage current conducting device for connection between the low-voltage level and said first device;
   a trigger pulse source for generating a trigger pulse; and
   passive means responsive to the trigger pulse from said source for triggering said second device to conduct, said responsive means being operable upon conduction of said second device to apply substantially the full trigger pulse to said first device for triggering said first device to conduct.

2. The circuit of claim 1, wherein said first and second devices are ignitrons, each having an anode, a cathode and an ignitor.

3. The circuit of claim 2, wherein said passive means includes means for providing a low resistance path from the low voltage level to each of said ignitrons for conduction of the trigger pulse to the ignitor and cathode of each ignitron.

4. The circuit of claim 3, wherein said low resistance path includes a string of diodes connected between the low voltage level and the high voltage level.

5. The circuit of claim 4, wherein said passive means includes a plurality of varistors connected across said diodes for clamping the voltage thereacross, below a predetermined level.

6. The circuit of claim 5, including said varistors and additional means for channeling current from the high voltage level to the low voltage level through each said ignitrons upon their being fired.

7. The circuit of claim 2, including means for limiting the starting current from ignitor to cathode of each ignitron.

8. The circuit of claim 2, further including means for speeding the triggering of each ignitron.

9. The circuit of claim 2, further including means for maintaining zero voltage across said ignitrons in their unfired condition.

10. The circuit of claim 2, further including means for limiting the voltage rise across the ignitor and cathode of each ignitron during ignition.

11. The circuit of claim 2, including means to apply said pulse to the cathode of said second ignitron.

12. The circuit of claim 1, wherein said pulse source is operable to generate a negative pulse with respect to the low voltage level.

13. A method for shunting current from a high voltage level to a low voltage level through a plurality of ignitrons each including an anode, a cathode and an ignitor, connected anode-to-cathode in a series string from the high voltage level to the low voltage level, comprising the steps of:
   applying a trigger pulse across the ignitron string to ignite the ignitron having its cathode connected to the low voltage level; and
   conducting the trigger pulse successively to each ignitron towards the high voltage level, each successive ignitron being ignited thereby to conduction so that upon conduction of the ignitron having its anode connected to the high voltage level, the current at the high voltage level is shunted through the ignitrons to the low voltage level.

14. The method of claim 13, including the step of conducting the trigger pulse to the ignitor and cathode of each successive ignitron over a low resistance path from the low voltage level.

15. The method of claim 13, including the step of channeling current from the high voltage level to the low voltage level through each of the ignitrons upon their being fired.

16. The method of claim 13, wherein the applied trigger pulse is negative.

* * * * *